US011212748B2

(12) United States Patent
Wu

(10) Patent No.: US 11,212,748 B2
(45) Date of Patent: Dec. 28, 2021

(54) METHOD OF MONITORING RAR, METHOD OF SENDING RAR, DEVICES THEREOF AND SYSTEM

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'An Dongguan (CN)

(*) Notice: Subject to any disclaimer, the term of this patent is extended or adjusted under 35 U.S.C. 154(b) by 96 days.

(21) Appl. No.: 16/634,147

(22) PCT Filed: Jul. 27, 2018

(86) PCT No.: PCT/CN2018/097485
§ 371 (c)(1),
(2) Date: Jan. 25, 2020

(87) PCT Pub. No.: WO2019/024790
PCT Pub. Date: Feb. 7, 2019

(65) Prior Publication Data
US 2020/0236623 A1   Jul. 23, 2020

(30) Foreign Application Priority Data
Aug. 2, 2017 (CN) .......................... 201710651194.5

(51) Int. Cl.
*H04W 52/02*       (2009.01)
*H04B 7/08*        (2006.01)
(Continued)

(52) U.S. Cl.
CPC ........ *H04W 52/0229* (2013.01); *H04B 7/088* (2013.01); *H04W 74/004* (2013.01); *H04W 74/006* (2013.01); *H04W 74/0833* (2013.01)

(58) Field of Classification Search
CPC ...................................................... H04W 52/02
See application file for complete search history.

(56) References Cited

U.S. PATENT DOCUMENTS

2016/0029358 A1   1/2016  Hou et al.
2016/0309507 A1  10/2016  Park
(Continued)

FOREIGN PATENT DOCUMENTS

CN    106888507 A    6/2017
EP    3 048 851 A1   7/2016
(Continued)

OTHER PUBLICATIONS

International Written Opinion issued in corresponding PCT application No. PCT/CN2018/097485, dated Feb. 13, 2020.
(Continued)

*Primary Examiner* — Sulaiman Nooristany
(74) *Attorney, Agent, or Firm* — Maschoff Brennan

(57) ABSTRACT

A method of monitoring a Random Access Response (RAR), a method of sending a RAR, devices thereof and a system are provided. The method includes: sending a random access preamble to a base station; monitoring a RAR sent by the base station, at a time position of a downlink beam corresponding to the random access preamble. Since the RAR only needs to be monitored at the time position of the downlink beam corresponding to the random access preamble, the power consumption of the user terminal may be reduced.

10 Claims, 7 Drawing Sheets

(51) Int. Cl.
*H04W 74/00* (2009.01)
*H04W 74/08* (2009.01)

(56) References Cited

U.S. PATENT DOCUMENTS

2017/0026962 A1 1/2017 Liu et al.
2019/0037605 A1* 1/2019 Agiwal ................ H04W 24/10

FOREIGN PATENT DOCUMENTS

EP 3048851 A1 7/2016
WO 2016/086144 A1 6/2016

OTHER PUBLICATIONS

European Search Report issued in corresponding application No. 18842197.8, dated Jun. 19, 2020.
Chinese Office Action issued in corresponding application No. 201710651194.5, dated Jan. 16, 2020.
Ericsson, Higher layer implications of beamforming during random access, R2-1702795, Spokane, USA, 5 pages, Apr. 3-7, 2017.
Guangdong OPPO Mobile Telecom, NR 4-Step Random Access Procedure, R1-1707694, Hangzhou, P.R. China, 5 pages, May 15-19, 2017.
Guangdong OPPO Mobile Telecom, Discussion on Random Access Procedure for NR, R1-1700548, Spokane, USA, 3 pages, Jan. 16-20, 2017.
LG Electronics, Consideration of Random Access Response in NR, R2-1706846, Qingdao, China, 2 pages, Jun. 27-29, 2017.
MediaTek Inc., Discussion on multi-beam RAR window design, R1-1704464, Spokane, USA, 4 pages, Apr. 3-7, 2017.
MediaTek Inc., Discussion on random access procedure in NR, R1-1707841, Hongzhou, P.R. China, 6 pages, May 15-19, 2017.
NTT Docomo, Inc., Design for RACH Procedure for NR, Goteborg, Sweden, 4 pages, Aug. 22-26, 2016.
CN Search Report dated Jan. 8, 2020 as received in Application No. 201710651194.5.
CN Office Action dated Jan. 16, 2020 as received in Application No. 201710651194.5.

* cited by examiner

METHOD OF MONITORING RAR, METHOD OF SENDING RAR, DEVICES THEREOF AND SYSTEM

CROSS-REFERENCE TO RELATED APPLICATION

This application is the U.S. national phase of PCT Application PCT/CN2018/097485 filed on Jul. 27, 2018, which claims a priority to Chinese Patent Application No. 201710651194.5 filed in China on Aug. 2, 2017, the disclosure of which is incorporated herein in its entirety by reference.

TECHNICAL FIELD

The present disclosure relates to the field of communication technologies, and in particular, to a method of monitoring a Random Access Response (RAR), a method of sending a RAR, devices thereof and a system.

BACKGROUND

In the random access procedure, the user terminal needs to send a Random Access Preamble to the base station. This message can be defined as message 1 (Msg1). After that, the user terminal needs to monitor the downlink channel at the entire RAR window to receive the RAR issued by the base station. This message can be defined as message 2 (Msg2). However, the user terminal monitors at all positions of the entire RAR window, so the power consumption of the user terminal is relatively large.

SUMMARY

A method of monitoring a RAR, a method of sending a RAR, devices thereof and a system are provided in the embodiments of the present disclosure, to solve the technical issue that the power consumption of the user terminal is relatively large.

In a first aspect, a method of monitoring a RAR is provided in the embodiments of the present disclosure, applied to a user terminal and including:

sending a random access preamble to a base station;

monitoring a RAR sent by the base station, at a time position of a downlink beam corresponding to the random access preamble.

In a second aspect, a method of sending a RAR is provided in the embodiments of the present disclosure, applied to a base station and including:

receiving a random access preamble sent by a user terminal;

sending a RAR through a downlink beam corresponding to the random access preamble.

In a third aspect, a user terminal is provided in the embodiments of the present disclosure, including:

a sending module, configured to send a random access preamble to a base station;

a monitoring module, configured to monitor a RAR sent by the base station, at a time position of a downlink beam corresponding to the random access preamble.

In a fourth aspect, a base station is provided in the embodiments of the present disclosure, including:

a receiving module, configured to receive a random access preamble sent by a user terminal;

a first sending module, configured to send a RAR through a downlink beam corresponding to the random access preamble.

In a fifth aspect, a user terminal is provided in the embodiments of the present disclosure, including: a memory, a processor and a RAR monitoring program stored in the memory and executable on the processor, where the RAR monitoring program is executed by the processor to perform the method of monitoring a RAR in the embodiments of the present disclosure.

In a sixth aspect, a base station is provided in the embodiments of the present disclosure, including: a memory, a processor and a RAR sending program stored in the memory and executable on the processor, where the RAR sending program is executed by the processor to perform the method of sending a RAR in the embodiments of the present disclosure.

In a seventh aspect, a RAR transmission system is provided in the embodiments of the present disclosure, including the user terminal and the base station in the embodiments of the present disclosure.

In an eighth aspect, a computer-readable storage medium is provided in the embodiments of the present disclosure, where a RAR monitoring program is stored on the computer-readable storage medium, and the RAR monitoring program is executed by a processor to perform the method of monitoring a RAR in the embodiments of the present disclosure.

In a ninth aspect, a computer-readable storage medium is provided in the embodiments of the present disclosure, where a RAR sending program is stored on the computer-readable storage medium, and the RAR sending program is executed by a processor to perform the method of sending a RAR in the embodiments of the present disclosure.

BRIEF DESCRIPTION OF THE DRAWINGS

In order to describe the technical solutions of the embodiments of the present disclosure more clearly, the drawings used in the description of the embodiments of the present disclosure are briefly described below. Obviously, the drawings in the following description are merely some embodiments of the present disclosure. For those of ordinary skill in the art, other drawings may be obtained according to these drawings without creative work.

DETAILED DESCRIPTION

The technical solutions in the embodiments of the present disclosure will be described hereinafter clearly and completely with reference to the drawings of the embodiments of the present disclosure. Obviously, the embodiments described hereinafter are a part of the embodiments of the present disclosure, not all of embodiments of the present disclosure. According to the embodiments of the present disclosure, all other embodiments acquired by those ordinary skilled in the art without creative work will fall into the scope of the present disclosure.

Figure 1:
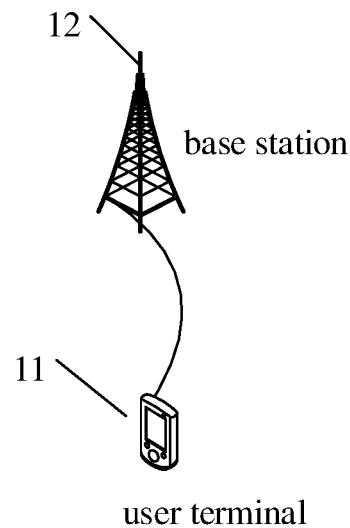
FIG. 1 is a schematic view of a RAR transmission system in the embodiments of the present disclosure.

Referring to FIG. 1 which is a schematic view of an RAR transmission system in the embodiments of the present disclosure. As shown in FIG. 1, the RAR transmission system includes a user terminal 11 and a base station 12, where the user terminal 11 may be a User Equipment (UE). For example, the UE may be a mobile phone, a tablet personal computer, a laptop computer, a personal digital assistant (PDA), a mobile Internet device (MID), or a wearable device. It should be noted that terminal-side equipment is not limited to a specific type in the embodiment of the present disclosure. The above base station 12 may be a 5G base station (e.g., gNB, 5G NR NB), or may be a 4G base station (e.g., eNB), or may be a 3G base station (e.g., NB), etc. It should be noted that in the embodiments of the present disclosure, the specific type of the base station 12 is not limited.

It should be noted that the specific functions of the user terminal 11 and the base station 12 will be described in detail through the following embodiments.

Figure 2:
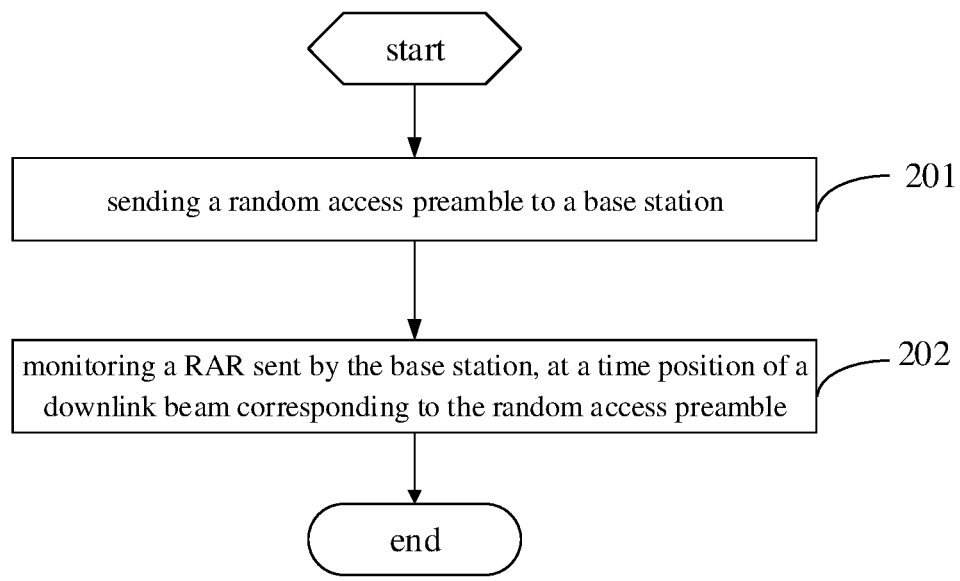
FIG. 2 is a flowchart of a method of monitoring an RAR in the embodiments of the present disclosure.

Referring to FIG. 2 is a flowchart of a method of monitoring RAR in the embodiments of the present disclosure. As shown in FIG. 2, the method includes the following steps:

Step 201: sending a random access preamble to a base station.

The random access preamble may be defined as Msg1 in a random access procedure, and the random access procedure may be a contention-based random access procedure or a non-contention-based random access procedure. Before the non-contention-based random access procedure, the user terminal may receive Msg0 which is sent by the base station for allocating dedicated random access resources.

Step 202: monitoring a RAR sent by the base station, at a time position of a downlink beam corresponding to the random access preamble.

The downlink beam corresponding to the above random access preamble may be: selected by the user terminal for this random access preamble before sending this random access preamble, or pre-configured by the user terminal, or configured to the user terminal by the base station, etc. The embodiments of the present disclosure are not limited thereto. The time position of the above downlink beam may be a time position configured by a base station, or may be a time position detected in advance by a user terminal.

In addition, it should be noted that the base station may send the RAR through the above downlink beam.

According to the above steps, it is able to reduce the time for the user terminal to monitor the downlink signal in the RAR window, thereby reducing the power consumption of the user terminal.

In this way, in the embodiment of the present disclosure, a random access preamble is sent to a base station, and a RAR sent by the base station is monitored at a time position of a downlink beam corresponding to the random access preamble. Since the RAR only needs to be monitored at the time position of the downlink beam corresponding to the random access preamble, the power consumption of the user terminal may be reduced.

Figure 3:
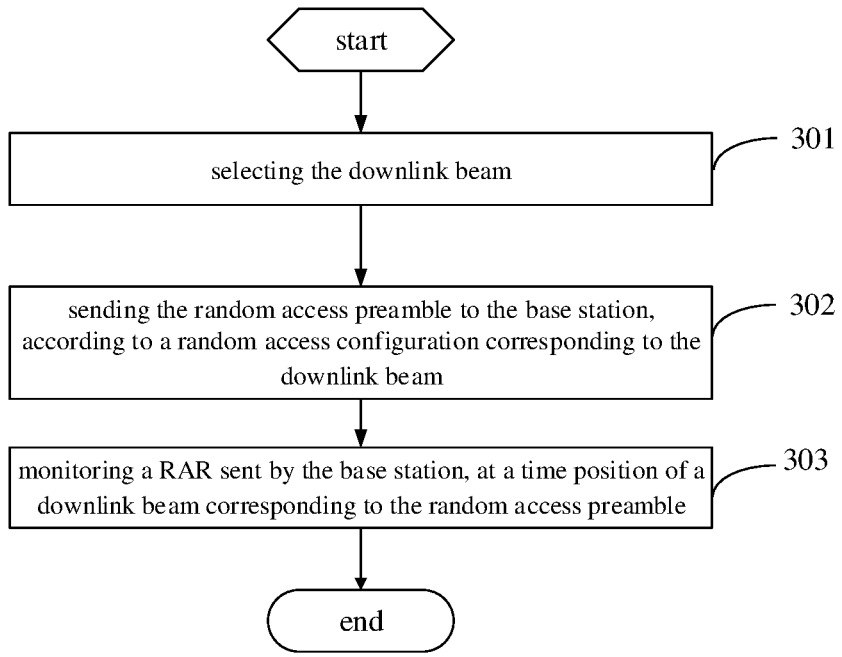
FIG. 3 is a flowchart of another method of monitoring an RAR in the embodiments of the present disclosure.

Referring to FIG. 3 which is a flowchart of another method of monitoring an RAR in the embodiments of the present disclosure. As shown in FIG. 3, the method includes the following steps:

Step 301: selecting the downlink beam.

The above selecting the downlink beam may be selecting a downlink beam corresponding to a received downlink signal, or may be selecting according to a random access preamble to be sent, or may be selecting a receiving beam with the strongest receiving signal through a beam measurement; or, in the non-contention-based random, may be selecting a downlink beam for sending Msg0, or the downlink beam is selected based on the indication information sent by a base station, etc., which is not limited in this embodiment of the present disclosure.

Step 302: sending the random access preamble to the base station, according to a random access configuration corresponding to the downlink beam.

The above-mentioned random access configuration corresponding to the downlink beam may be pre-configured by the user terminal for this downlink beam, or the user terminal may determine the corresponding random access configuration according to the pre-stored correspondence between the downlink beam and the random access configuration. In addition, the random access configuration corresponding to the downlink beam may be an access resource corresponding to the downlink beam, and the access resource may be a time domain resource, or may be a frequency domain resource, or may also be a corresponding code resource, that is, in Step 302, a random access preamble may be sent on a corresponding access resource.

According to the above steps 301 and 302, the random access preamble may adopt the random access configuration corresponding to the downlink beam, thereby improving the random access performance of the user terminal, and the base station may directly select the downlink beam to send the RAR according to the random access configuration, without determining to use the above-mentioned downlink beam in other methods.

It should be noted that, in this embodiment, Steps 301 and 302 are optional. For example, the step of sending the random access preamble may be performed by using a configuration other than the random access configuration corresponding to the downlink beam. The embodiment of the present disclosure is not limited herein.

Step 303: monitoring a RAR sent by the base station, at a time position of a downlink beam corresponding to the random access preamble.

Optionally, the monitoring the RAR sent by the base station at the time position of the downlink beam corresponding to the random access preamble includes:

determining a receiving time position of the downlink beam corresponding to the random access preamble in a RAR window, according to time information of a downlink beam sweeping; monitoring the RAR sent by the base station, at the receiving time position The above RAR window may be a fixed window preset by a user terminal, or the RAR window may be a RAR window set by the user terminal according to a position of a downlink beam and corresponding to the position.

In addition, the time information of the downlink beam sweeping may be time information indicating the receiving time position. In addition, the base station sends the RAR at a certain time of the receiving time position, so that the user terminal may accurately monitor the RAR sent by the base station, and the power consumption of the user terminal may be reduced.

Optionally, the monitoring the RAR sent by the base station at the time position of the downlink beam corresponding to the random access preamble includes:

determining a receiving time position of the downlink beam corresponding to the random access preamble, according to time information of a downlink beam sweeping; setting a RAR window according to the receiving time position; and monitoring the RAR sent by the base station, through the RAR window.

For the time information of the above-mentioned downlink beam sweeping, reference may be made to the above embodiment, which is not repeated here, and the same beneficial effects may be achieved. The setting the RAR window according to the receiving time position may be setting an RAR window equal to the above receiving time position, or setting an RAR window including the receiving time position. In this embodiment, a relatively short time window may be achieved in setting the RAR window, thereby further reducing the power consumption of the user terminal.

Optionally, the time information of the above-mentioned downlink beam sweeping may be pre-configured by the base station to the user terminal, or pre-defined in a protocol. For example, the base station sends the above time information through a broadcast message.

Optionally, the time information of the downlink beam sweeping includes at least one of:

a start time of changing a beam sweeping direction, an end time of changing the beam sweeping direction and a time period of changing the beam sweeping.

Figure 4:
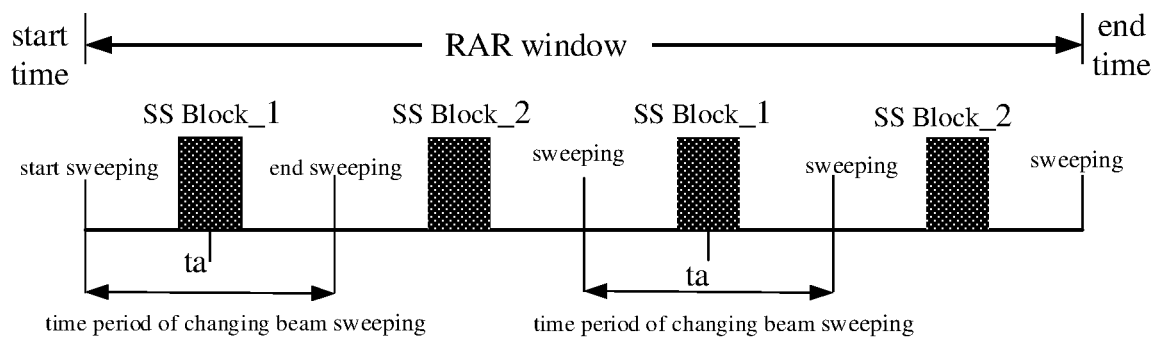
FIG. 4 is a schematic view of monitoring an RAR in the embodiments of the present disclosure.

For example, as shown in FIG. 4, two time periods of changing beam sweeping (valid period for RAR) are included in one RAR window, where the time period may be indicated by the start time and end time of the time information, and may be indicated directly by the above-mentioned time information, that is, the time information includes a time period of the changing beam sweeping, and to may represent the sending time of the RAR. In addition, in the example shown in FIG. 4, the downlink beam corresponding to the random access preamble may be a downlink beam that sends a Synchronization Signal Block (SS Block)_1.

In this embodiment, the receiving time position of the user terminal may be determined by at least one of a start time of changing a beam sweeping direction, an end time of changing the beam sweeping direction and a time period of changing the beam sweeping, thereby reducing the power consumption of the user terminal.

Optionally, the determining the receiving time position of the downlink beam corresponding to the random access preamble according to the time information of the downlink beam sweeping includes:

determining the receiving time position of the downlink beam corresponding to the random access preamble, according to the time information of the downlink beam sweeping and within the time period of changing the beam sweeping.

Here, the time period of changing the beam sweeping may be determined according to a start time of changing the beam sweeping direction and an end time of changing the beam sweeping direction, or may be a time period of changing the beam sweeping in the time information.

In addition, the receiving time position may be a time position of receiving a downlink signal in a time period of changing the beam sweeping, or may be all time positions in the time period of changing beam sweeping.

Figure 5:
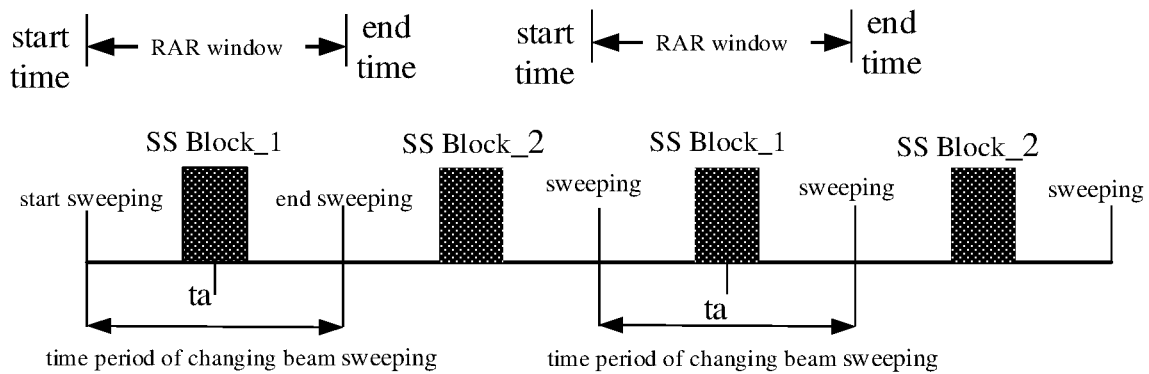
FIG. 5 is another schematic view of monitoring an RAR in the embodiments of the present disclosure.

In this embodiment, the RAR may be monitored only in the time period of changing the beam sweeping, for example, the time period of changing the beam sweeping shown in FIG. 4 or FIG. 5, thereby reducing the power consumption of the user terminal.

Optionally, the determining the receiving time position of the downlink beam corresponding to the random access preamble according to the time information of the downlink beam sweeping and within the time period of changing the beam sweeping includes:

determining, according to the time information of the downlink beam sweeping, a time position of a reference signal associated with the random access preamble within the time period of changing the beam sweeping as the receiving time position of the downlink beam corresponding to the random access preamble;

or determining, according to the time information of the downlink beam sweeping, a sending time position of a downlink beam corresponding to a reference signal associated with the random access preamble within the time period of changing the beam sweeping as the receiving time position of the downlink beam corresponding to the random access preamble.

The reference signal associated with the random access preamble may be a reference signal that has an association relationship or correspondence relationship with the random access preamble, for example, an SS block or a user terminal-specific reference signal. For example, as shown in FIG. 4 or FIG. 5, the time position of the reference signal associated with the random access preamble may be the time position of the SS block_1. The sending time position of the downlink beam corresponding to the reference signal associated with the random access preamble may be a time period of changing the beam sweeping where SS block_1 is located.

In this embodiment, the RAR may be monitored at the time position of the reference signal associated with the random access preamble or the sending time position of the downlink beam corresponding to the reference signal associated with the random access preamble, thereby reducing the power consumption of the user terminal.

Optionally, subsequent to the sending the random access preamble to the base station, the method further includes:

cancelling the monitoring of the RAR sent by the base station, at a time position of a reference signal not associated with the random access preamble within the RAR window; and/or cancelling the monitoring of the RAR sent by the base station, at a sending time position of a downlink beam corresponding to a reference signal not associated with the random access preamble within the RAR window.

In this embodiments, at the time position of the reference signal not associated with the random access preamble or the sending time position of the downlink beam corresponding to the reference signal not associated with the random access preamble, the user terminal may not monitor the RAR sent by the base station. For example, as shown in FIG. 4 or FIG. 5, the RAR is not monitored in the time period of changing beam sweeping to which SS block_2 belongs, thereby further reducing the power consumption of the user terminal.

Optionally, the monitoring the RAR sent by the base station at the time position of the downlink beam corresponding to the random access preamble includes:

detecting position information of the downlink beam corresponding to the random access preamble; determining, according to the position information, a receiving time position of the downlink beam corresponding to the random access preamble in a RAR window; and monitoring, at the receiving time position, the RAR sent by the base station;

or detecting position information of the downlink beam corresponding to the random access preamble; determining, according to the position information, a receiving time position of the downlink beam corresponding to the random access preamble; setting a RAR window according to the receiving time position; and monitoring the RAR sent by the base station, through the RAR window.

The position information may be position information of the above downlink beam detected by the user terminal before monitoring the RAR, for example, the user terminal detects the position information such as a subframe, a time slot, or a symbol of the reference signal sent by the downlink beam.

In this embodiment, because the position information of the downlink beam corresponding to the random access preamble is detected in advance to determine the receiving time position, thereby reducing the overhead of system signaling and saving the transmission resources.

Optionally, subsequent to the sending the random access preamble to the base station, the method further includes:

starting the RAR receiving timer according to a configuration of the base station or an agreement in a protocol, where a running time of the RAR timer is a length of the RAR window.

Here, the above RAR receiving timer may be started after one or more subframes after the random access preamble is sent, and the running time of the RAR receiving timer may be pre-configured, for example, a time length of the RAR window shown in FIG. 4.

In this embodiment, the RAR may be monitored at one or more receiving time positions within a single continuous RAR window, thereby improving the random access performance of the user terminal.

Optionally, a length of the RAR window is a running time of a RAR receiving timer;

the setting the RAR window according to the receiving time position includes:

starting or restarting the RAR receiving timer at a start time of the receiving time position;

stopping the RAR receiving timer at an end time of the receiving time position.

The start time of the receiving time position can be understood as the start time of monitoring the RAR by the user terminal, and the end time of the receiving time position can be understood as the end time of monitoring the RAR by the user terminal, of course, this can refer to the start time and end time of monitoring the RAR by the user terminal in a single time. For example, as shown in FIG. 5, a user terminal starts or restarts two RAR receiving timers, and a time length of each RAR receiving timer is a time period of changing the beam sweeping. Of course, this is only an example. For example, the RAR receiving timer may also be an SS Block_1 time position.

In this embodiment, a plurality of discrete RAR windows may be started, thereby further reducing the power consumption of the user terminal. For example, the user terminal starts or restarts the RAR receiving timer at the start time of the receiving time position of the RAR receiving-related physical channel, and stops the RAR receiving timer at the end time of the receiving time position of the RAR receiving-related physical channel.

Optionally, the monitoring the RAR sent by the base station at the time position of the downlink beam corresponding to the random access preamble includes:

monitoring the RAR which is sent by the base station through a RAR receiving-related physical channel, at the time position of the downlink beam corresponding to the random access preamble.

The RAR receiving-related physical channel may be a physical downlink control channel (PDCCH) or a physical downlink shared channel (PDSCH).

In this embodiment, the user terminal may only monitor the RAR receiving-related physical channel, thereby further reducing the power consumption of the user terminal.

According to the above steps, the power consumption of the user terminal may be reduced and the random access performance of the user terminal may be improved.

Figure 6:
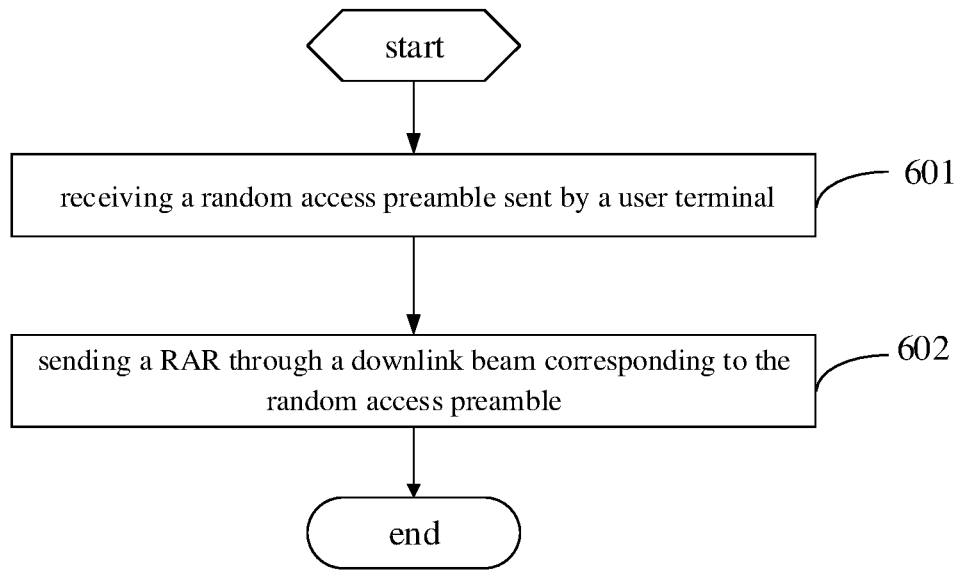
FIG. 6 is a flowchart of a method of sending an RAR in the embodiments of the present disclosure.

Referring to FIG. 6 which is a flowchart of a method of sending an RAR in the embodiments of the present disclosure. As shown in FIG. 6, the method includes the following steps:

Step 601: receiving a random access preamble sent by a user terminal.

For the foregoing random access preamble, reference may be made to the corresponding description of the embodiment shown in FIG. 2, the same beneficial effects can be achieved, and the details thereof are omitted herein.

Step 602: sending a RAR through a downlink beam corresponding to the random access preamble.

For the downlink beam corresponding to the random access preamble, reference may be made to the corresponding description of the embodiment shown in FIG. 2, which is not described in detail, and the same beneficial effects can be achieved. In addition, the sending the RAR may be sending the RAR at one or more time resources in the position of the downlink beam.

In this embodiment, a random access preamble sent by a user terminal is received, and a RAR is sent through a downlink beam corresponding to the random access preamble. Because the RAR only needs to be monitored at the time position of the downlink beam corresponding to the random access preamble, the power consumption of the user terminal may be reduced.

Figure 7:
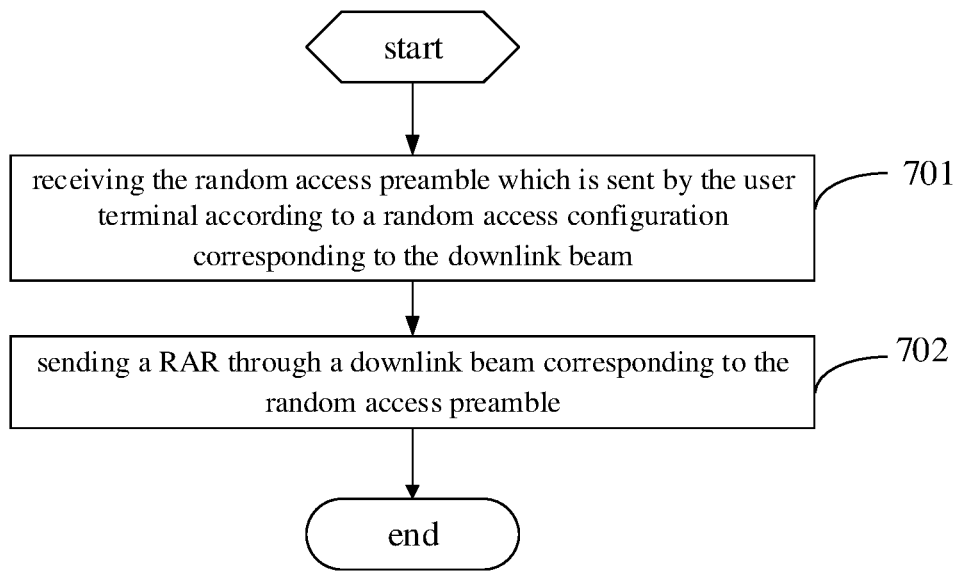
FIG. 7 is a flowchart of another method of receiving an RAR in the embodiments of the present disclosure.

Referring to FIG. 7 which is a flowchart of a method of sending an RAR in the embodiments of the present disclosure. As shown in FIG. 7, the method includes the following steps:

Step 701: receiving the random access preamble which is sent by the user terminal according to a random access configuration corresponding to the downlink beam.

For the foregoing random access configuration, reference may be made to the corresponding description of the embodiment shown in FIG. 3, which is not described in detail, and the same beneficial effects can be achieved.

Step 702: sending a RAR through a downlink beam corresponding to the random access preamble.

Optionally, prior to the receiving the random access preamble sent by the user terminal, the method further includes:

sending time information of a downlink beam sweeping to the user terminal, where the time information of the downlink beam sweeping is configured to enable the user terminal to: determine a receiving time position of the downlink beam corresponding to the random access preamble in a RAR window, according to the time information of the downlink beam sweeping; and monitor the RAR sent by the base station, at the receiving time position;

or the time information of the downlink beam sweeping is configured to enable the user terminal to: determine a receiving time position of the downlink beam corresponding to the random access preamble, according to the time information of the downlink beam sweeping; set a RAR window according to the receiving time position; and monitor the RAR sent by the base station, through the RAR window.

For the foregoing time information, reference may be made to the corresponding description of the embodiment shown in FIG. 3, which is not described in detail, and the same beneficial effects can be achieved.

Optionally, the time information of the downlink beam sweeping includes at least one of:

a start time of changing a beam sweeping direction, an end time of changing the beam sweeping direction and a time period of changing the beam sweeping.

For the start time of changing the beam sweeping direction, the end time of changing the beam sweeping direction and the time period of changing the beam sweeping, reference may be made to the corresponding description of the embodiment shown in FIG. 3.

Optionally, the sending the RAR through the downlink beam corresponding to the random access preamble includes:

determining a sending time position of the downlink beam corresponding to the random access preamble, according to the time information of the downlink beam sweeping and within the time period of changing the beam sweeping; and sending the RAR through the downlink beam corresponding to the random access preamble and at the sending time position.

For the foregoing sending time position, reference may be made to the corresponding description of the receiving time position of the embodiment shown in FIG. 3, which is not described in detail, and the same beneficial effects can be achieved. In addition, the base station may send the RAR on one or more time resources in the sending time position.

Optionally, the determining the sending time position of the downlink beam corresponding to the random access preamble, according to the time information of the downlink beam sweeping and within the time period of changing the beam sweeping includes:

determining, according to the time information of the downlink beam sweeping, a time position of a reference signal associated with the random access preamble within the time period of changing the beam sweeping as the sending time position of the downlink beam corresponding to the random access preamble; or determining, according to the time information of the downlink beam sweeping, a sending time position of a downlink beam corresponding to a reference signal associated with the random access preamble within the time period of changing the beam sweeping as the sending time position of the downlink beam corresponding to the random access preamble.

For the foregoing sending time position, reference may be made to the corresponding description of the receiving time position of the embodiment shown in FIG. 3, which is not described in detail, and the same beneficial effects can be achieved.

Optionally, subsequent to the receiving the random access preamble sent by the user terminal, the method further includes:

cancelling the sending of the RAR, at a time position of a reference signal not associated with the random access preamble;

and/or cancelling the sending of the RAR, at a sending time position of a downlink beam corresponding to a reference signal not associated with the random access preamble.

For the foregoing cancelling the sending of RAR, reference may be made to the corresponding description that the user terminal does not monitor the RAR in the embodiment shown in FIG. 3, which is not described in detail, Sand the same beneficial effects can be achieved.

Optionally, the sending the RAR through the downlink beam corresponding to the random access preamble includes:

sending the RAR through a RAR sending-related physical channel, through the downlink beam corresponding to the random access preamble.

For the RAR sending-related physical channel, reference may be made to the corresponding description that the user terminal does not monitor the RAR in the embodiment shown in FIG. 3, which is not described in detail, and the same beneficial effects can be achieved.

In this embodiment, the power consumption of the user terminal may be reduced and the random access performance of the user terminal may be improved.

Figure 8:
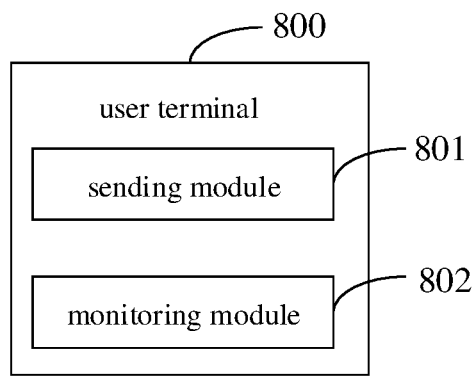
FIG. 8 is a schematic view of a user terminal in the embodiments of the present disclosure.

Please refer to FIG. 8. FIG. 8 is a schematic view of a user terminal applied in the embodiments of the present disclosure. As shown in FIG. 8, the user terminal 800 includes:

a sending module 801, configured to send a random access preamble to a base station;

a monitoring module 802, configured to monitor a RAR sent by the base station, at a time position of a downlink beam corresponding to the random access preamble.

Figure 9:
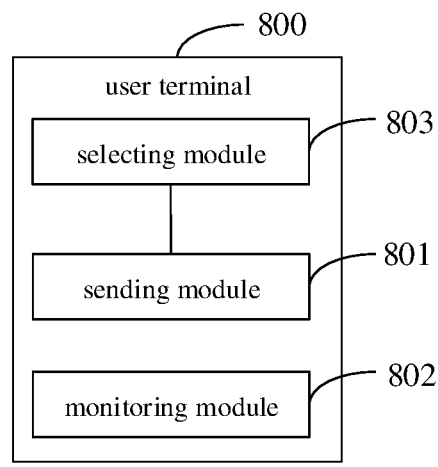
FIG. 9 is a schematic view of another user terminal in the embodiments of the present disclosure.

Optionally, as shown in FIG. 9, the user terminal further includes:

a selecting module 803, configured to select the downlink beam;

the sending module 801 is further configured to send the random access preamble to the base station, according to a random access configuration corresponding to the downlink beam.

Optionally, the monitoring module 802 is further configured to: determine a receiving time position of the downlink beam corresponding to the random access preamble in a RAR window, according to time information of a downlink beam sweeping; monitor the RAR sent by the base station, at the receiving time position;

or the monitoring module 802 is further configured to: determine a receiving time position of the downlink beam corresponding to the random access preamble, according to time information of a downlink beam sweeping; set a RAR window according to the receiving time position; and monitor the RAR sent by the base station, through the RAR window.

Optionally, the time information of the downlink beam sweeping is pre-configured by the base station to the user terminal or pre-defined in a protocol.

Optionally, the time information of the downlink beam sweeping includes at least one of a start time of changing a beam sweeping direction, an end time of changing the beam sweeping direction and a time period of changing the beam sweeping.

Optionally, the monitoring module 802 is further configured to: determine the receiving time position of the downlink beam corresponding to the random access preamble, according to the time information of the downlink beam sweeping and within the time period of changing the beam sweeping; set the RAR window according to the receiving time position; and monitor the RAR sent by the base station, through the RAR window.

Optionally, the monitoring module 802 is further configured to: determine, according to the time information of the downlink beam sweeping, a time position of a reference signal associated with the random access preamble within the time period of changing the beam sweeping as the receiving time position of the downlink beam corresponding to the random access preamble; set the RAR window according to the receiving time position; and monitor the RAR sent by the base station, through the RAR window; or the monitoring module 802 is further configured to: determine, according to the time information of the downlink beam sweeping, a sending time position of a downlink beam corresponding to a reference signal associated with the random access preamble within the time period of changing the beam sweeping as the receiving time position of the downlink beam corresponding to the random access preamble; set the RAR window according to the receiving time position; and monitor the RAR sent by the base station, through the RAR window.

Figure 10:
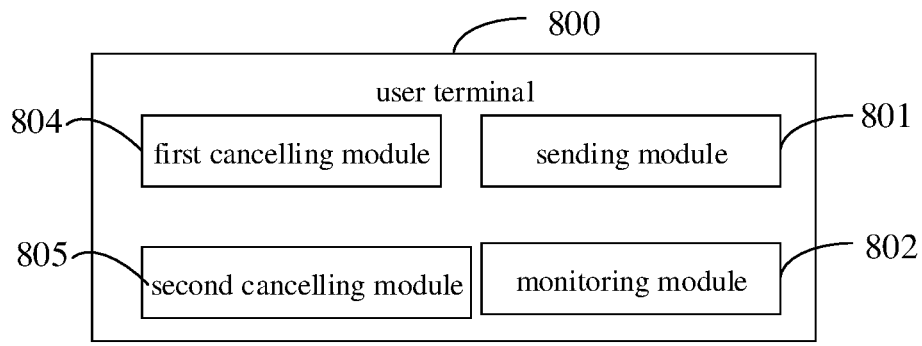
FIG. 10 is another schematic view of a user terminal in the embodiments of the present disclosure.

Optionally, as shown in FIG. 10, the user terminal further includes:

a first cancelling module 804, configured to cancel the monitoring of the RAR sent by the base station, at a time position of a reference signal not associated with the random access preamble within the RAR window;

and/or a second cancelling module 805, configured to cancel the monitoring of the RAR sent by the base station, at a sending time position of a downlink beam corresponding to a reference signal not associated with the random access preamble within the RAR window.

Optionally, the monitoring module 802 is further configured to: detect position information of the downlink beam corresponding to the random access preamble; determine, according to the position information, a receiving time position of the downlink beam corresponding to the random access preamble in a RAR window; and monitor, at the receiving time position, the RAR sent by the base station;

or the monitoring module 802 is further configured to: detect position information of the downlink beam corresponding to the random access preamble; determine, according to the position information, a receiving time position of the downlink beam corresponding to the random access preamble; set a RAR window according to the receiving time position; and monitor the RAR sent by the base station, through the RAR window.

Optionally, the monitoring module 802 is further configured to: determine the receiving time position of the downlink beam corresponding to the random access preamble, according to time information of the downlink beam sweeping; start or restart the RAR receiving timer at a start time of the receiving time position; stop the RAR receiving timer at an end time of the receiving time position; and monitor the RAR sent by the base station, through the RAR window; where a length of the RAR window is a running time of a RAR receiving timer.

Optionally, the monitoring module 802 is further configured to: monitor the RAR which is sent by the base station through a RAR receiving-related physical channel, at the time position of the downlink beam corresponding to the random access preamble.

It should be noted that the user terminal 800 in this embodiment may be a user terminal in any of the method embodiments of the present disclosure, and any embodiment of the user terminal in the method embodiments of the present disclosure may be implemented by the user terminal 800 in the embodiment, and the same beneficial effects may be achieved, which will not be repeated here.

Figure 11:
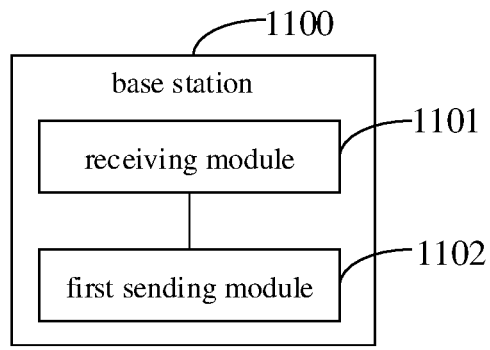
FIG. 11 is a schematic view of a base station in the embodiments of the present disclosure.

Referring to FIG. 11 which is a schematic view of a base station in the embodiments of the present disclosure. As shown in FIG. 11, the base station 1100 includes:

a receiving module 1101, configured to receive a random access preamble sent by a user terminal;

a first sending module 1102, configured to send a RAR through a downlink beam corresponding to the random access preamble.

Optionally, the receiving module 1101 is further configured to receive the random access preamble which is sent by the user terminal according to a random access configuration corresponding to the downlink beam.

Figure 12:
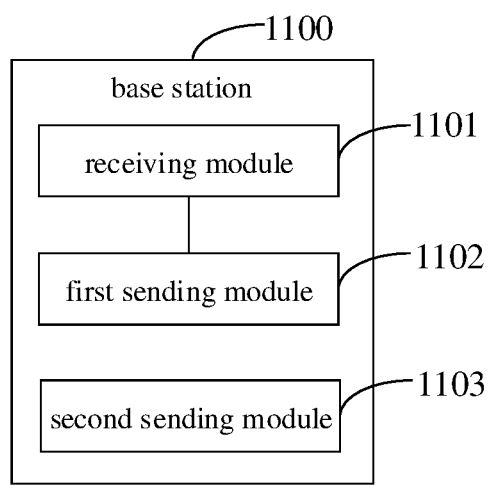
FIG. 12 is another schematic view of a base station in the embodiments of the present disclosure.

Optionally, as shown in FIG. 12, the base station further includes:

a second sending module 1103, configured to send time information of a downlink beam sweeping to the user terminal; where the time information of the downlink beam sweeping is configured to enable the user terminal to: determine a receiving time position of the downlink beam corresponding to the random access preamble in a RAR window, according to the time information of the downlink beam sweeping; and monitor the RAR sent by the base station, at the receiving time position;

or the time information of the downlink beam sweeping is configured to enable the user terminal to: determine a receiving time position of the downlink beam corresponding to the random access preamble, according to the time information of the downlink beam sweeping; set a RAR window according to the receiving time position; and monitor the RAR sent by the base station, through the RAR window.

Optionally, the time information of the downlink beam sweeping includes at least one of a start time of changing a beam sweeping direction, an end time of changing the beam sweeping direction and a time period of changing the beam sweeping.

Figure 13:
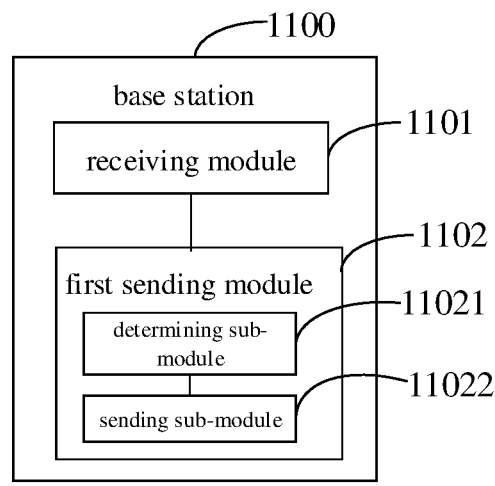
FIG. 13 is another schematic view of a base station in the embodiments of the present disclosure.

Optionally, as shown in FIG. 13, the first sending module 1102 includes:

a determining sub-module 11021, configured to determine a sending time position of the downlink beam corresponding to the random access preamble, according to the time information of the downlink beam sweeping and within the time period of changing the beam sweeping; and a sending sub-module 11022, configured to send the RAR through the downlink beam corresponding to the random access preamble and at the sending time position.

Optionally, the determining sub-module 11021 is further configured to: determine, according to the time information of the downlink beam sweeping, a time position of a reference signal associated with the random access preamble within the time period of changing the beam sweeping as the sending time position of the downlink beam corresponding to the random access preamble;

or the determining sub-module 11021 is further configured to: determine, according to the time information of the downlink beam sweeping, a sending time position of a downlink beam corresponding to a reference signal associated with the random access preamble within the time period of changing the beam sweeping as the sending time position of the downlink beam corresponding to the random access preamble.

Figure 14:
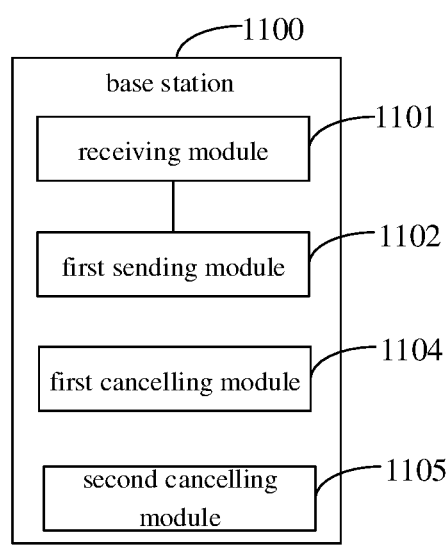
FIG. 14 is another schematic view of a base station in the embodiments of the present disclosure.

Optionally, as shown in FIG. 14, the base station 1100 further includes:

a first cancelling module 1104, configured to cancel the sending of the RAR, at a time position of a reference signal not associated with the random access preamble;

and/or a second cancelling module 1105, configured to cancel the sending of the RAR, at a sending time position of a downlink beam corresponding to a reference signal not associated with the random access preamble.

Optionally, the first sending module 1102 is further configured to send the RAR through a RAR sending-related physical channel, through the downlink beam corresponding to the random access preamble.

It should be noted that the base station 1100 in this embodiment may be any base station in the method embodiment of the present disclosure, and any embodiment of the base station in the method embodiment of the present disclosure may be implemented by the base station 1100 in the embodiments, and the same beneficial effects may be achieved, which will not be repeated here.

Figure 15:
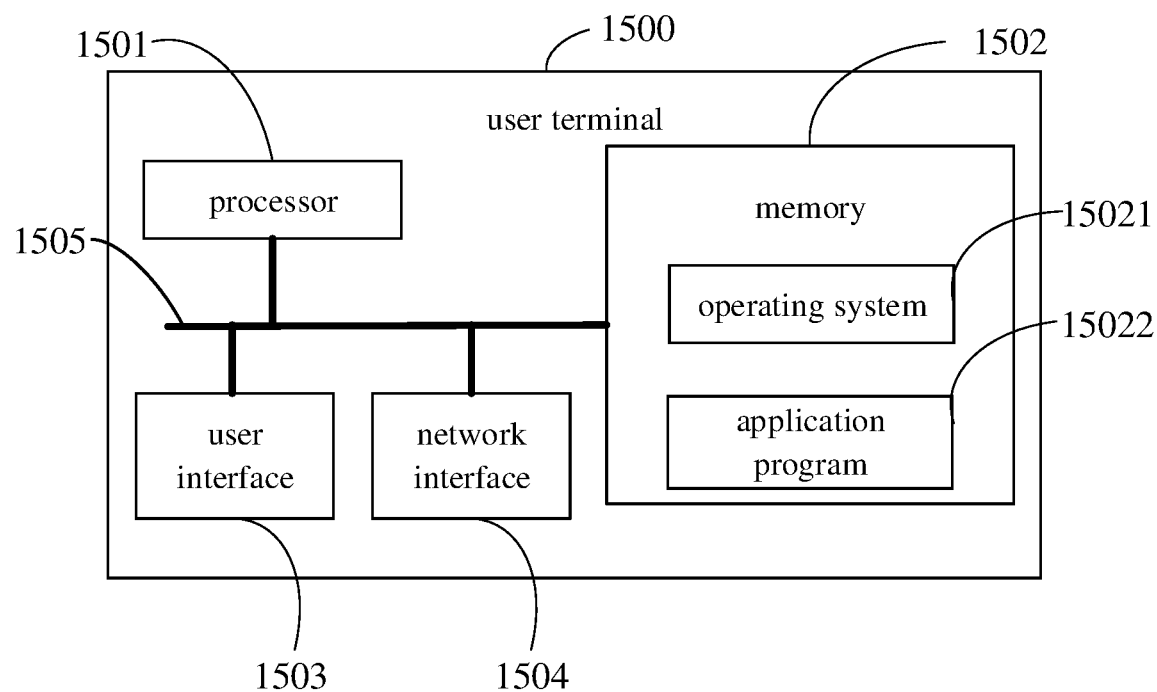
FIG. 15 is another schematic view of a user terminal in the embodiments of the present disclosure.

FIG. 15 is a schematic view of a user terminal in the embodiments of the present disclosure. As shown in FIG. 15, the user terminal 1500 includes: at least one processor 1501, a memory 1502, at least one network interface 1504, and a user interface 1503. The various components in the user terminal 1500 are coupled together through a bus system 1505. It can be understood that the bus system 1505 is used to implement connection and communication between these components. The bus system 1505 includes a power bus, a control bus, and a status signal bus in addition to the data bus. However, for the sake of clarity, various buses are marked as the bus system 1505 in FIG. 15.

The user interface 1503 may include a display, a keyboard, or a pointing device (for example, a mouse, a track ball, a touch panel, or a touch screen).

It can be understood that the memory 1502 in the embodiment of the present disclosure may be a volatile memory or a non-volatile memory, or may include both volatile and non-volatile memory. The non-volatile memory may be a read-only memory (ROM), a programmable read-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (DDRSDRAM), enhanced synchronous dynamic random access memory (Enhanced SDRAM, ESDRAM), synchronous connection dynamic random access memory (Synchlink DRAM, SLDRAM), and Direct memory bus random access memory (Direct Rambus RAM, DRRAM). The memory 1502 of the systems and methods described herein is intended to include, but is not limited to, these and any other suitable types of memory.

In some embodiments, the memory 1502 stores executable modules or data structures, or a subset thereof, or an extended set thereof: an operating system 15021 and an application program 15022.

The operating system 15021 includes various system programs, such as a framework layer, a core library layer, and a driver layer, etc., and is used to implement various basic services and process hardware-based tasks. The application program 15022 includes various application programs, such as a Media Player, a Browser, and the like, and is used to implement various application services. A program for implementing the method of the embodiment of the present disclosure may be included in an application program 15022.

In the embodiment of the present disclosure, the user terminal 1500 further includes a RAR monitoring program stored in the memory 1502 and executable on the processor 1501. Specifically, the RAR monitoring program stored in the application program 8022 is executed by the processor 1501 to perform:

sending a random access preamble to a base station;

monitoring a RAR sent by the base station, at a time position of a downlink beam corresponding to the random access preamble.

The method disclosed in the foregoing embodiment of the present disclosure may be applied to the processor 1501, or implemented by the processor 1501. The processor 1501 may be an integrated circuit chip and has a signal processing capability. In the implementation process, each step of the above method may be completed by an integrated logic circuit of hardware in the processor 1501 or an instruction in the form of software. The processor 1501 may be a general-purpose processor, a digital signal processor (DSP), an application specific integrated circuit (ASIC), a Field Programmable Gate Array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory 1502, and the processor 1501 reads the information in the memory 1502 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Equipment (DSPD), and programmable logic, Programmable Logic Device (PLD), Field Programmable Gate Array (FPGA), general-purpose processor, controller, microcontroller, microprocessor, and other electronic units for performing the functions described in this application Or a combination thereof.

For software implementation, the techniques described herein can be implemented through modules (e.g., procedures, functions, etc.) that perform the functions described herein. Software codes may be stored in a memory and executed by a processor. The memory may be implemented in the processor or the external processor.

Optionally, prior to the sending the random access preamble to the base station, the RAR monitoring program is executed by the processor 1501 to perform:

selecting the downlink beam;

the sending the random access preamble to the base station performed by the processor 1501 includes:

sending the random access preamble to the base station, according to a random access configuration corresponding to the downlink beam.

Optionally, the monitoring the RAR sent by the base station at the time position of the downlink beam corresponding to the random access preamble performed by the processor 1501 includes:

determining a receiving time position of the downlink beam corresponding to the random access preamble in a RAR window, according to time information of a downlink beam sweeping; monitoring the RAR sent by the base station, at the receiving time position;

or determining a receiving time position of the downlink beam corresponding to the random access preamble, according to time information of a downlink beam sweeping; setting a RAR window according to the receiving time position; and monitoring the RAR sent by the base station, through the RAR window.

Optionally, the time information of the downlink beam sweeping is pre-configured by the base station to the user terminal or pre-defined in a protocol.

Optionally, the time information of the downlink beam sweeping includes at least one of a start time of changing a beam sweeping direction, an end time of changing the beam sweeping direction and a time period of changing the beam sweeping.

Optionally, the determining the receiving time position of the downlink beam corresponding to the random access preamble according to the time information of the downlink beam sweeping performed by the processor 1501 includes:

determining the receiving time position of the downlink beam corresponding to the random access preamble, according to the time information of the downlink beam sweeping and within the time period of changing the beam sweeping.

Optionally, the determining the receiving time position of the downlink beam corresponding to the random access preamble according to the time information of the downlink beam sweeping and within the time period of changing the beam sweeping performed by the processor 1501 includes:

determining, according to the time information of the downlink beam sweeping, a time position of a reference signal associated with the random access preamble within the time period of changing the beam sweeping as the receiving time position of the downlink beam corresponding to the random access preamble;

or determining, according to the time information of the downlink beam sweeping, a sending time position of a downlink beam corresponding to a reference signal associated with the random access preamble within the time period of changing the beam sweeping as the receiving time position of the downlink beam corresponding to the random access preamble.

Optionally, subsequent to the sending the random access preamble to the base station, the RAR monitoring program is executed by the processor 1501 to perform:

cancelling the monitoring of the RAR sent by the base station, at a time position of a reference signal not associated with the random access preamble within the RAR window; and/or cancelling the monitoring of the RAR sent by the base station, at a sending time position of a downlink beam corresponding to a reference signal not associated with the random access preamble within the RAR window.

Optionally, the monitoring the RAR sent by the base station at the time position of the downlink beam corresponding to the random access preamble performed by the processor 1501 includes:

detecting position information of the downlink beam corresponding to the random access preamble; determining, according to the position information, a receiving time position of the downlink beam corresponding to the random access preamble in a RAR window; and monitoring, at the receiving time position, the RAR sent by the base station;

or detecting position information of the downlink beam corresponding to the random access preamble; determining, according to the position information, a receiving time position of the downlink beam corresponding to the random access preamble; setting a RAR window according to the receiving time position; and monitoring the RAR sent by the base station, through the RAR window.

Optionally, a length of the RAR window is a running time of a RAR receiving timer;

the setting the RAR window according to the receiving time position includes:

starting or restarting the RAR receiving timer at a start time of the receiving time position;

stopping the RAR receiving timer at an end time of the receiving time position.

Optionally, subsequent to the sending the random access preamble to the base station, the RAR monitoring program is executed by the processor 1501 to perform:

starting or restarting the RAR receiving timer at a start time of the receiving time position;

stopping the RAR receiving timer at an end time of the receiving time position.

Optionally, the monitoring the RAR sent by the base station at the time position of the downlink beam corresponding to the random access preamble performed by the processor 1501 includes: monitoring the RAR which is sent by the base station through a RAR receiving-related physical channel, at the time position of the downlink beam corresponding to the random access preamble.

It should be noted that the above-mentioned user terminal 1500 in this embodiment may be a user terminal in any of the method embodiments of the present disclosure, and any embodiment of the user terminal in the method embodiments of the present disclosure may be implemented by the user terminal 1500 of the above embodiments of the present disclosure, and the same beneficial effects may be achieved, and details thereof are not described herein again.

Figure 16:
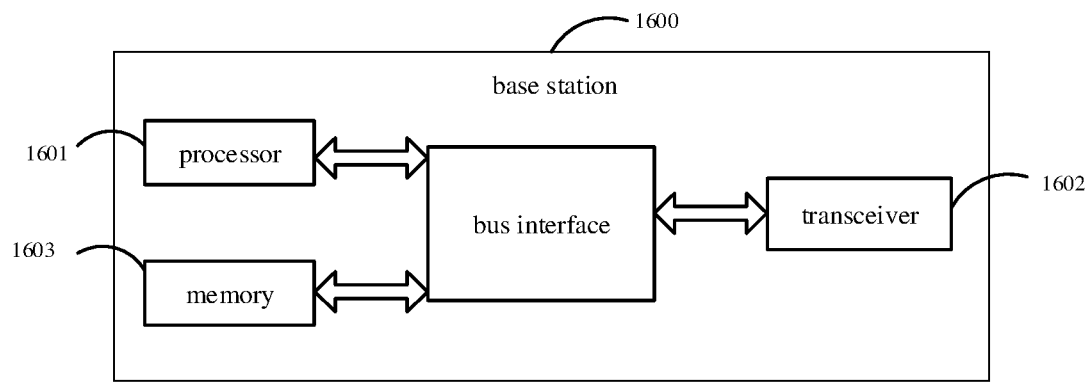
FIG. 16 is another schematic view of a base station in the embodiments of the present disclosure.

Referring to FIG. 16 which is a schematic view of a base station in the embodiments of the present disclosure. As shown in FIG. 16, the base station 1600 includes: a processor 1601, a transceiver 1602, a memory 1603, and a bus interface.

In the embodiment of the present disclosure, the base station 1600 further includes: a RAR sending program stored in the memory 1603 and running on the processor 1601. The sending program of the RAR is executed by the processor 1601 to perform:

receiving a random access preamble sent by a user terminal;

sending a RAR through a downlink beam corresponding to the random access preamble.

The transceiver 1602 is configured to receive and send data under the control of the processor 1601. The transceiver 1602 includes at least two antenna ports.

In FIG. 16, the bus architecture may include any number of interconnected buses and bridges, and one or more processors specifically represented by the processor 1601 and various circuits of the memory represented by the memory 1603 are linked together. The bus architecture can also link various other circuits such as peripherals, voltage regulators, and power management circuits, which are well known in the art, so they are not further described herein. The bus interface provides an interface. The transceiver 1602 may be a plurality of elements, including a transmitter and a receiver, providing a unit for communicating with various other devices on a transmission medium. For different user devices, the user interface 1604 may also be an interface capable of externally connecting and connecting the required devices. The connected devices include, but are not limited to, a keypad, a display, a speaker, a microphone, a joystick, and the like.

The processor 1601 is responsible for managing the bus architecture and general processing, and the memory 1603 may store data used by the processor 1601 when performing operations.

Optionally, the receiving the random access preamble sent by the user terminal performed by the processor 1601 includes:

receiving the random access preamble which is sent by the user terminal according to a random access configuration corresponding to the downlink beam.

Optionally, prior to the receiving the random access preamble sent by the user terminal, the RAR sending program is executed by the processor 1601 to perform:

sending time information of a downlink beam sweeping to the user terminal; where the time information of the downlink beam sweeping is configured to enable the user terminal to: determine a receiving time position of the downlink beam corresponding to the random access preamble in a RAR window, according to the time information of the downlink beam sweeping; and monitor the RAR sent by the base station, at the receiving time position;

or the time information of the downlink beam sweeping is configured to enable the user terminal to: determine a receiving time position of the downlink beam corresponding to the random access preamble, according to the time information of the downlink beam sweeping; set a RAR window according to the receiving time position; and monitor the RAR sent by the base station, through the RAR window.

Optionally, the time information of the downlink beam sweeping includes at least one of a start time of changing a beam sweeping direction, an end time of changing the beam sweeping direction and a time period of changing the beam sweeping.

Optionally, the sending the RAR through the downlink beam corresponding to the random access preamble performed by the processor 1601 includes:

determining a sending time position of the downlink beam corresponding to the random access preamble, according to the time information of the downlink beam sweeping and within the time period of changing the beam sweeping; and sending the RAR through the downlink beam corresponding to the random access preamble and at the sending time position.

Optionally, the determining the sending time position of the downlink beam corresponding to the random access preamble, according to the time information of the downlink beam sweeping and within the time period of changing the beam sweeping performed by the processor 1601 includes:

determining, according to the time information of the downlink beam sweeping, a time position of a reference signal associated with the random access preamble within the time period of changing the beam sweeping as the sending time position of the downlink beam corresponding to the random access preamble;

or determining, according to the time information of the downlink beam sweeping, a sending time position of a downlink beam corresponding to a reference signal associated with the random access preamble within the time period of changing the beam sweeping as the sending time position of the downlink beam corresponding to the random access preamble.

Optionally, subsequent to the receiving the random access preamble sent by the user terminal, the RAR sending program is executed by the processor 1601 to perform:

cancelling the sending of the RAR, at a time position of a reference signal not associated with the random access preamble;

and/or cancelling the sending of the RAR, at a sending time position of a downlink beam corresponding to a reference signal not associated with the random access preamble.

Optionally, the sending the RAR through the downlink beam corresponding to the random access preamble performed by the processor 1601 includes:

sending the RAR through a RAR sending-related physical channel, through the downlink beam corresponding to the random access preamble.

It should be noted that the above-mentioned base station 1600 in this embodiment may be a base station in any of the method embodiments of the present disclosure, and any embodiment of the base station in the method embodiments of the present disclosure may be implemented by the base station 1600 of the above embodiments of the present disclosure, and the same beneficial effects may be achieved, and details thereof are not described herein again.

A user terminal is further provided in the embodiments of the present disclosure, including: a memory, a processor and a RAR monitoring program stored in the memory and executable on the processor, where the RAR monitoring program is executed by the processor to perform the method of monitoring a RAR in the embodiments of the present disclosure.

A base station is further provided in the embodiments of the present disclosure, including: a memory, a processor and a RAR sending program stored in the memory and executable on the processor, where the RAR sending program is executed by the processor to perform the method of sending a RAR in the embodiments of the present disclosure.

A RAR transmission system is further provided in the embodiments of the present disclosure, including the user terminal and the base station in the embodiments of the present disclosure.

A computer-readable storage medium is further provided in the embodiments of the present disclosure, where a RAR monitoring program is stored on the computer-readable storage medium, and the RAR monitoring program is executed by a processor to perform the method of monitoring a RAR in the embodiments of the present disclosure.

A computer-readable storage medium is further provided in the embodiments of the present disclosure, where a RAR sending program is stored on the computer-readable storage medium, and the RAR sending program is executed by a processor to perform the method of sending a RAR in the embodiments of the present disclosure.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A person skilled in the art can use different methods to implement the described functions for each specific application, but such implementation should not be considered to be beyond the scope of the present disclosure.

Those skilled in the art may clearly understand that, for the convenience and brevity of description, the specific working processes of the systems, devices, and units described above may refer to the corresponding processes in the foregoing method embodiments, and are not repeated here.

In the embodiments of the present disclosure, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objectives of the solutions of the embodiments of the present disclosure.

In addition, each functional unit in each embodiment of the present disclosure may be integrated into one processing unit, or each unit may exist separately physically, or two or more units may be integrated into one unit.

When the functions are implemented in the form of software functional units and sold or used as independent products, they can be stored in a computer-readable storage medium. According to this understanding, the technical solution of the present disclosure is essentially a part that contributes to the existing technology or a part of the technical solution can be embodied in the form of a software product. The computer software product is stored in a storage medium, including several instructions are used to cause a computer device (which may be a personal computer, a server, or a network device, etc.) to perform all or part of the steps of the method described in various embodiments of the present disclosure. The foregoing storage medium includes various media that can store program codes, such as a U disk, a mobile hard disk, a ROM, a RAM, a magnetic disk, or an optical disk.

The above are only some embodiments of the present disclosure, and it should be noted that those skilled in the art may also make several improvements and refinements without departing from the principles of the present disclosure, which should also be considered as the scope of the present disclosure. Therefore, the scope of the present disclosure should be determined by the scope of the claims.

What is claimed is:

1. A method of monitoring a Random Access Response (RAR), applied to a user terminal and comprising:
    sending a random access preamble to a base station;
    monitoring a RAR sent by the base station, at a time position of a downlink beam corresponding to the random access preamble;
    the monitoring step further comprises: determining a receiving time position of the downlink beam corresponding to the random access preamble in a RAR window, according to time information of a downlink beam sweeping; monitoring the RAR sent by the base station, at the receiving time position; or determining a receiving time position of the downlink beam corresponding to the random access preamble, according to time information of a downlink beam sweeping; setting a RAR window according to the receiving time position; and monitoring the RAR sent by the base station, through the RAR window;
    wherein the time information of the downlink beam sweeping comprises at least one of a start time of changing a beam sweeping direction, an end time of changing the beam sweeping direction and a time period of changing the beam sweeping.

2. The method according to claim 1, wherein prior to the sending the random access preamble to the base station, the method further comprises: selecting the downlink beam;
    the sending the random access preamble to the base station comprises:
    sending the random access preamble to the base station, according to a random access configuration corresponding to the downlink beam.

3. The method according to claim 1, wherein the time information of the downlink beam sweeping is pre-configured by the base station to the user terminal or pre-defined in a protocol.

4. The method according to claim 1, wherein the determining the receiving time position of the downlink beam corresponding to the random access preamble according to the time information of the downlink beam sweeping comprises:
    determining the receiving time position of the downlink beam corresponding to the random access preamble, according to the time information of the downlink beam sweeping and within the time period of changing the beam sweeping.

5. The method according to claim 4, wherein the determining the receiving time position of the downlink beam corresponding to the random access preamble according to the time information of the downlink beam sweeping and within the time period of changing the beam sweeping comprises:
    determining, according to the time information of the downlink beam sweeping, a time position of a reference signal associated with the random access preamble within the time period of changing the beam sweeping as the receiving time position of the downlink beam corresponding to the random access preamble; or determining, according to the time information of the downlink beam sweeping, a sending time position of a downlink beam corresponding to a reference signal associated with the random access preamble within the time period of changing the beam sweeping as the receiving time position of the downlink beam corresponding to the random access preamble.

6. The method according to claim 5, wherein subsequent to the sending the random access preamble to the base station, the method further comprises:

cancelling the monitoring of the RAR sent by the base station, at a time position of a reference signal not associated with the random access preamble within the RAR window; and/or cancelling the monitoring of the RAR sent by the base station, at a sending time position of a downlink beam corresponding to a reference signal not associated with the random access preamble within the RAR window.

7. The method according to claim 1, wherein the monitoring the RAR sent by the base station at the time position of the downlink beam corresponding to the random access preamble comprises:

detecting position information of the downlink beam corresponding to the random access preamble; determining, according to the position information, a receiving time position of the downlink beam corresponding to the random access preamble in a RAR window; and monitoring, at the receiving time position, the RAR sent by the base station; or detecting position information of the downlink beam corresponding to the random access preamble; determining, according to the position information, a receiving time position of the downlink beam corresponding to the random access preamble; setting a RAR window according to the receiving time position; and monitoring the RAR sent by the base station, through the RAR window.

8. The method according to claim 1, wherein a length of the RAR window is a running time of a RAR receiving timer;

the setting the RAR window according to the receiving time position comprises:

starting or restarting the RAR receiving timer at a start time of the receiving time position;

stopping the RAR receiving timer at an end time of the receiving time position.

9. The method according to claim 1, wherein the monitoring the RAR sent by the base station at the time position of the downlink beam corresponding to the random access preamble comprises: monitoring the RAR which is sent by the base station through a RAR receiving-related physical channel, at the time position of the downlink beam corresponding to the random access preamble.

10. A user terminal, comprising: a memory, a processor and a RAR sending program stored in the memory and executable on the processor, wherein the RAR sending program is executed by the processor to:

send a random access preamble to a base station;

monitor a RAR sent by the base station, at a time position of a downlink beam corresponding to the random access preamble;

the monitor step further comprises: determine a receiving time position of the downlink beam corresponding to the random access preamble in a RAR window, according to time information of a downlink beam sweeping; monitor the RAR sent by the base station, at the receiving time position; or determine a receiving time position of the downlink beam corresponding to the random access preamble, according to time information of a downlink beam sweeping; setting a RAR window according to the receiving time position; and monitoring the RAR sent by the base station, through the RAR window;

wherein the time information of the downlink beam sweeping comprises at least one of a start time of changing a beam sweeping direction, an end time of changing the beam sweeping direction and a time period of changing the beam sweeping.

* * * * *